(12) United States Patent
Fukuchi

(10) Patent No.: US 9,437,872 B2
(45) Date of Patent: Sep. 6, 2016

(54) NEGATIVE ELECTRODE FOR RECHARGEABLE LITHIUM BATTERY, METHOD OF PREPARING THE SAME AND RECHARGEABLE LITHIUM BATTERY INCLUDING THE SAME

(71) Applicant: Samsung SDI Co., Ltd., Yongin-si, Gyeonggi-do (KR)

(72) Inventor: Iwao Fukuchi, Minoh (JP)

(73) Assignee: Samsung SDI Co., Ltd., Yongin-si (KR)

( * ) Notice: Subject to any disclaimer, the term of this patent is extended or adjusted under 35 U.S.C. 154(b) by 264 days.

(21) Appl. No.: 14/083,318

(22) Filed: Nov. 18, 2013

(65) Prior Publication Data

US 2014/0154562 A1 Jun. 5, 2014

(30) Foreign Application Priority Data

Dec. 4, 2012 (JP) .................................. 2012-265715
Aug. 2, 2013 (KR) ........................ 10-2013-0092105

(51) Int. Cl.
| | |
|---|---|
| H01M 4/134 | (2010.01) |
| H01M 4/38 | (2006.01) |
| H01M 4/1395 | (2010.01) |
| H01M 4/62 | (2006.01) |
| H01M 10/052 | (2010.01) |

(52) U.S. Cl.
CPC ............. *H01M 4/386* (2013.01); *H01M 4/134* (2013.01); *H01M 4/1395* (2013.01); *H01M 4/387* (2013.01); *H01M 4/622* (2013.01); *H01M 10/052* (2013.01); *Y02E 60/122* (2013.01)

(58) Field of Classification Search
CPC .. H01M 4/134; H01M 4/622; H01M 4/1395; H01M 4/386; H01M 4/387
USPC .................................. 429/211, 217; 427/77
See application file for complete search history.

(56) References Cited

U.S. PATENT DOCUMENTS

| | | | |
|---|---|---|---|
| 7,931,984 B2 | 4/2011 | Choi et al. | |
| 2012/0088155 A1* | 4/2012 | Yushin ..................... | H01M 2/16 |
| | | | 429/217 |
| 2013/0184385 A1 | 7/2013 | Ogihara | |
| 2014/0004418 A1 | 1/2014 | Kobayashi et al. | |

FOREIGN PATENT DOCUMENTS

| | | |
|---|---|---|
| JP | 2007-052940 A | 3/2007 |
| JP | 2010-097761 A | 4/2010 |
| JP | 2012-069453 A | 4/2012 |
| KR | 10-2003-0026814 A | 4/2003 |
| KR | 10-2009-0110133 A | 10/2009 |
| KR | 10-2011-0046517 A | 5/2011 |
| WO | WO 2011/140150 A1 | 11/2011 |
| WO | WO 2012/017738 A1 | 2/2012 |
| WO | WO 2012/128182 A1 | 9/2012 |
| WO | WO 2012/132153 A1 | 10/2012 |

OTHER PUBLICATIONS

Extended European Search Report dated Sep. 10, 2015 for European Patent Application No. EP 13 195 236.8, which shares priority of Japanese Patent Application No. JP 2012-265715, filed Dec. 4, 2012, and Korean Patent Application No. KR 10-2013-0092105, filed Aug. 2, 2013, with captioned U.S. Appl. No. 14/083,318.

\* cited by examiner

*Primary Examiner* — Edward Cain
(74) *Attorney, Agent, or Firm* — Knobbe Martens Olson & Bear LLP

(57) ABSTRACT

A negative electrode for a rechargeable lithium battery is disclosed. The negative electrode includes a current collector and a negative active material layer positioned on the current collector and including a negative active material and a binder, wherein the negative active material includes a silicon-based material, a tin-based material, or a combination thereof, and the binder includes an organic acid including a carboxyl group-containing polymer and an organic base having a cyclic structure. A method of preparing the same, and a rechargeable lithium battery including the same are also disclosed.

18 Claims, 1 Drawing Sheet

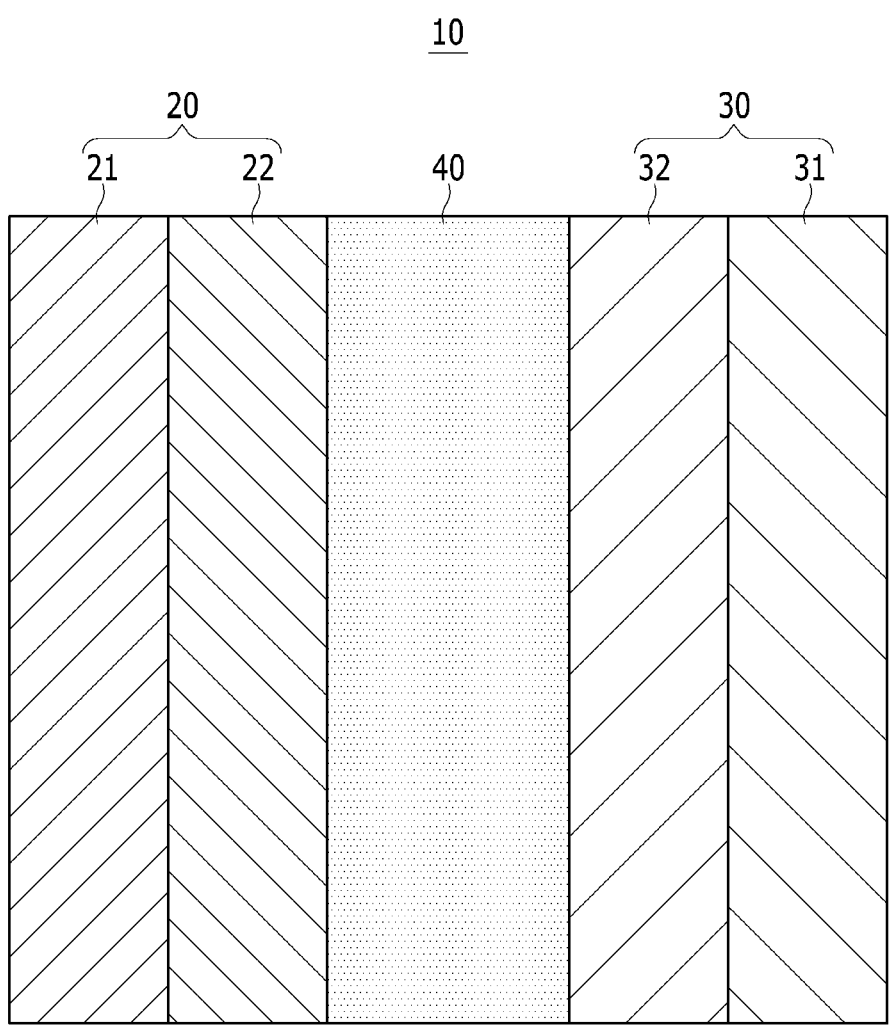

NEGATIVE ELECTRODE FOR RECHARGEABLE LITHIUM BATTERY, METHOD OF PREPARING THE SAME AND RECHARGEABLE LITHIUM BATTERY INCLUDING THE SAME

CROSS-REFERENCE TO RELATED APPLICATIONS

Any and all priority claims identified in the Application Data Sheet, or any correction thereto, are hereby incorporated by reference under 37 CFR 1.57. For example, this application claims the benefit of Japanese Patent Application No. 2012-265715 filed in the Japanese Patent Office on Dec. 4, 2012 and Korean Patent Application No. 10-2013-0092105 in the Korean Intellectual Property Office on Aug. 2, 2013, the disclosures of which are incorporated herein by reference in their entirety.

BACKGROUND

1. Field

This invention relates to a negative electrode for a rechargeable lithium battery, a method of preparing the same, and a rechargeable lithium battery including the same.

2. Description of the Related Technology

A rechargeable lithium battery has wider application than a lead battery or a nickel cadmium battery because it has higher energy density. The silicon-based material or a tin-based material has been suggested to be used a negative active material for the rechargeable lithium battery. The silicon-based material or tin-based material may improve the discharge capacity of a rechargeable lithium battery when it is used as a negative active material. However, the silicon-based material and tin-based material undergo expansion and shrinkage during charge and discharge in an abrupt and destructive manner, and the binding or conductive networks between the silicon-based materials or between the tin-based materials may be interrupted. Therefore, when the silicon-based material or tin-based material is used as a negative active material, the performance of the rechargeable lithium battery may be problematic.

SUMMARY OF CERTAIN INVENTIVE ASPECTS

One aspect of the disclosure relates to a negative electrode for a rechargeable lithium battery having increased cycle-life characteristics of a rechargeable lithium battery.

Another aspect of the disclosure relates to a method of preparing the negative electrode for a rechargeable lithium battery.

Another aspect of the disclosure relates to a rechargeable lithium battery including the negative electrode for a rechargeable lithium battery.

In some embodiments, a negative electrode for a rechargeable lithium battery can include a current collector; and a negative active material layer positioned on the current collector and including a negative active material and a binder, wherein the negative active material includes a silicon-based material, a tin-based material, or a combination thereof, and the binder includes an organic acid including a carboxyl group-containing polymer and an organic base having a cyclic structure.

In some embodiments, the organic acid may include polyaspartic acid, polyaspartic acid, alginic acid of a natural polymer, a homopolymer of acrylic acid, and a copolymer of acrylic acid and another monomer, or a combination thereof.

In some embodiments, the weight average molecular weight of the organic acid may be in the range of about 5,000 g/mol to about 1,000,000 g/mol.

In some embodiments, the organic base may include an amine-based compound having a cyclic structure.

In some embodiments, the amine-based compound may include at least one selected from aromatic amine, alicyclic amine, and cyclic amine.

In some embodiments, the aromatic amine may include at least one selected from paraphenylene diamine, metaphenylene diamine, aniline, 3,5-diaminobenzoic acid, melamine, and a derivative thereof.

In some embodiments, the alicyclic amine may include at least one selected from cyclohexyl amine, cyclopentyl amine, norbornene amine, adamantane amine, and a derivative thereof.

In some embodiments, the cyclic amine may include at least one selected from a pyridine, piperidine, an azole-based compound, and a derivative thereof.

In some embodiments, the azole-based compound may include at least one selected from pyrrole, imidazole, pyrazole, and a triazole.

In some embodiments, the binder may include the organic acid and the organic base in a weight ratio of about 1:0.3 to about 1:1.

In some embodiments, the binder may have a thermosetting temperature of less than or equal to about 200° C.

In some embodiments, the silicon-based material may include a silicon-containing alloy.

In some embodiments, the method of preparing a negative electrode for a rechargeable lithium battery can include dissolving a carboxyl group-containing organic acid in water to obtain an acid solution; adding an organic base having a cyclic structure to the acid solution to obtain a binder solution; adding a negative active material including a silicon-based material, a tin-based material, or a combination thereof, to the binder solution to obtain a slurry; and coating the slurry on a current collector to form a negative active material layer.

In some embodiments, the viscosity of the acid solution may be in the range of about 4,000 cps to about 5,000 cps.

In some embodiments, the binder solution may have a pH of about 6 to about 9.

In some embodiments, the rechargeable lithium battery that includes a positive electrode; the instant negative electrode; and an electrolyte.

Other embodiments are included in the following detailed description.

Expansion and shrinkage of the negative active material may be suppressed and thus cycle-life characteristics of a rechargeable lithium battery may be increased.

BRIEF DESCRIPTION OF THE DRAWINGS

FIG. 1 is a cross-sectional view showing a schematic structure of a rechargeable lithium battery.

DETAILED DESCRIPTION OF CERTAIN INVENTIVE EMBODIMENTS

Hereinafter, embodiments of the disclosed technology are described in detail. However, these embodiments are exemplary, and this disclosure is not limited thereto.

One example of the rechargeable lithium battery is described referring to FIG. 1.

FIG. 1 is a cross-sectional view showing a schematic structure of a rechargeable lithium battery.

Referring to FIG. 1, a rechargeable lithium battery 10 includes a positive electrode 20, a negative electrode 30, and a separator 40 interposed between the positive electrode 20 and the negative electrode 30.

In some embodiments, the charge cut-off voltage (oxidation reduction potential) (vs. Li/Li$^+$) of the rechargeable lithium battery may be greater than or equal to about 4.3V and less than or equal to about 5.0V, and specifically greater than or equal to about 4.5V and less than or equal to about 5.0V.

The rechargeable lithium battery has no particular limit about its shape. In some embodiments, the rechargeable lithium battery may have a shape such as a cylinder, a prism, a laminated type, a button-type, and the like.

The negative electrode 30 includes a current collector 31 and a negative active material layer 32 formed on the current collector 31.

The current collector 31 may be any conductor. In some embodiments, the current collector 31 may be aluminum, stainless steel, nickel-plated steel, and the like.

The negative active material layer 32 may include a negative active material and a binder.

The negative active material may include a silicon-based material, a tin-based material, or a combination thereof.

In some embodiments, the silicon-based material may be a silicon particulate, a silicon oxide particulate, a mixture of a graphite material and the above particulate, a silicon-containing alloy, and the like. In some embodiments, the silicon-based material can be the silicon-containing alloy.

The silicon oxide particulate may be represented by $SiO_x$ (x is 1 or 2).

The silicon-containing alloy has no particular limit so long as silicon is deposited and can adsorb and release lithium. In some embodiments, the silicon-containing alloy may be an alloy of silicon and a transition metal of Ti, Ni, Cu, Fe, Co, and the like. One or more kinds of the transition metal may be used. The transition metal may be included in an amount of about 0.05 parts by weight to about 10 parts by weight based on 1 part by weight of silicon and provides an alloy.

In some embodiments, the silicon-containing alloy may be an inter-metallic compound such as $Mg_2Si$, $FeSi_2$, and the like.

The tin-based material may be, for example, a tin particulate, a tin oxide particulate, a mixture of a graphite material and the above particulate, a tin-containing alloy, and the like.

The tin oxide particulate may be represented by $SnO_y$, ($1.4 \leq y \leq 2.0$).

The tin-containing alloy may be, for example, $Cu_6Sn_5$, $Cu_3Sn$, $MnSn_2$, $FeSn_2$, $NiSn_4$, $Co_3Sn_2$, and the like.

The binder may include an organic acid including a carboxyl group-containing polymer and an organic base having a cyclic structure.

The binder may make bonds between the negative active material firms due to strong peeling strength.

The silicon-based material and the tin-based material may undergo shrinkage and expansion during charge and discharge of a rechargeable lithium battery. However, in some embodiments, shrinkage and expansion of the negative active material may be suppressed due to the use of a binder having strong peeling strength.

The binder may be an organic salt where the organic acid is neutralized by the organic base. The binder having such a structure may have high peeling strength.

The organic base may have a cyclic structure. The organic base having a cyclic structure may provide high peeling strength.

The binder may be an aqueous binder, and thus the solvent for a negative active material layer slurry may be water or other environmentally friendly solvent. Therefore, it may be environmentally-friendly compared with an organic solvent such as N-methyl-2-pyrrolidone (NMP) and the like.

The organic base may include an amine-based compound having a cyclic structure.

The amine-based compound may include at least one selected from aromatic amine, alicyclic amine, and cyclic amine.

The aromatic amine is an amine obtained by substituting hydrogen of ammonia with an aromatic compound. In some embodiments, the aromatic ring constituting the aromatic compound may be a heterocyclic ring.

The aromatic amine may include at least one selected from, for example, paraphenylene diamine, metaphenylene diamine, aniline, 3,5-diaminobenzoic acid, melamine, and a derivative thereof.

The alicyclic amine is an amine obtained by substituting hydrogen of ammonia with an alicyclic compound. The alicyclic compound may include a heterocyclic ring.

The alicyclic amine may include at least one selected from, for example, cyclohexyl amine, cyclopentyl amine, norbornene amine, adamantane amine, and a derivative thereof.

The cyclic amine is an amine where the nitrogen atom of the amine constitutes a part of heterocyclic ring.

In some embodiments, the cyclic amine may include at least one selected from pyridine, piperidine, an azole-based compound, and a derivative thereof. In some embodiments, the azole-based compound may include at least one selected from pyrrole, imidazole, pyrazole, and triazole.

The organic base may include at least one selected from paraphenylene diamine, meta phenylene diamine, aniline, 3,5-diamino benzoic acid, melamine, and cyclohexyl amine so as to increase dissolution.

The organic acid may include a carboxyl group-containing polymer.

For example, the organic acid may include polyaspartic acid, alginic acid of a natural polymer, a homopolymer of acrylic acid, and a copolymer of acrylic acid and another monomer, or a combination thereof.

Examples of the homopolymer of acrylic acid may be polyacrylic acid and the like.

The monomer copolymerized with the acrylic acid is not particularly limited and may include any aqueous binder of a rechargeable lithium battery.

In some embodiments, the monomer may be a nitrile group-containing monomer such as acrylonitrile, methacrylonitrile, and the like; an amide group-containing monomer such as acrylamide, N,N-dimethyl acrylamide, N-isopropyl acrylamide, and the like; a carboxyl group-containing monomer such as acrylic acid, methacrylic acid, maleic acid, crotonic acid, itaconic acid, citraconic acid, vinyl benzoic acid, carboxylethyl acrylate, and the like; a sulfo group-containing monomer such as vinylbenzene sulfonic acid, and the like; a phosphoric acid group-containing monomer such as acid phosphoxy ethyl methacrylate (for example, Phosmer M of Unichemical Corporation, Maharashtra, India), acid phosphoxy polyoxyethylene glycol monomethacrylate (for example, Phosmer PE of Unichemical Corporation, Maharashtra, India), 3-chloro-2-acid phosphoxy propyl methacrylate (for example, Phosmer CL of Unichemical Corporation, Maharashtra, India), acid phosphoxy polyoxy propylene glycol monomethacrylate (for example, Phosmer PP of Unichemical Corporation, Maharashtra, India), and the like.

In some embodiments, the monomer may include short-chain (meth)acrylic acid esters such as methyl(meth)acrylate, ethyl(meth)acrylate, propyl(meth)acrylate and the like; halgenated vinyls such as vinyl chloride, vinyl bromide, vinylidene chloride, and the like; maleic imide, phenyl maleimide, (meth)acrylamide, styrene, α-methylstyrene, vinyl acetate, sodium (meth)allyl sulfonate, sodium (meth) allyloxybenzenesulfonate, sodium styrene sulfonate, 2-acrylamide-2-methylpropanesulfonic acid, and salts thereof.

In some embodiments, the monomer may be ethylene glycol-based (meth)acrylates such as ethoxy diethylene glycol acrylate (for example, Lite acrylate EC-A of Kyoeisha Chemical Co., Ltd., Osaka, Japan), methoxy triethylene glycol acrylate (for example, Lite acrylate MTGA of Kyoeisha Chemical Co., Ltd., Osaka, Japan NK ester AM-30G of Shin Nakamura Chemical Co., Ltd., Wakayama, Japan), methoxy poly (n=9) ethylene glycol acrylate (for example, Lite acrylate 130-A of Kyoeisha Chemical Co., Ltd., NK ester AM-90G of Shin Nakamura Chemical Co., Ltd., Wakayama, Japan), methoxy poly(n=13)ethylene glycol acrylate (for example, NK ester AM-130G), methoxy poly (n=23)ethylene glycol acrylate (for example, NK ester AM-230G of Shin Nakamura Chemical Co., Ltd., Wakayama, Japan), octoxy poly (n=18)ethylene glycol acrylate (for example, NK ester A-OC-18E of Shin Nakamura Chemical Co., Ltd., Wakayama, Japan), phenoxy diethylene glycol acrylate (for example, Lite acrylate P-200A of Kyoeisha Chemical Co., Ltd., NK ester AMP-20GY of Shin Nakamura Chemical Co., Ltd., Wakayama, Japan), phenoxy poly(n=6)ethylene glycol acrylate (for example, NK ester AMP-60G of Shin Nakamura Chemical Co., Ltd., Wakayama, Japan), nonyl phenol EO addition product (n=4) acrylate (for example, Lite acrylate NP-4EA of Kyoeisha Chemical Co., Ltd., Wakayama, Japan), nonyl phenol EO addition product (n=8) acrylate (for example, Lite acrylate NP-8EA of Kyoeisha Chemical Co., Ltd., Osaka, Japan), methoxy diethylene glycol methacrylate (for example, Lite ester MC of Kyoeisha Chemical Co., Ltd., NK ester M-20G of Shin Nakamura Chemical Co., Ltd., Wakayama, Japan), methoxy triethylene glycol methacrylate (for example, Lite ester MTG of Kyoeisha Chemical Co., Ltd., Osaka, Japan), methoxy poly(n=9) ethylene glycol methacrylate (for example, Lite ester 130MA of Kyoeisha Chemical Co., Ltd., NK ester M-90G of Shin Nakamura Chemical Co., Ltd., Wakayama, Japan), methoxy poly(n=23) ethylene glycol methacrylate (for example, NK ester M-230G of Shin Nakamura Chemical Co., Ltd., Wakayama, Japan), methoxy poly(n=30) ethylene glycol methacrylate (for example, Lite ester 041MA of Kyoeisha Chemical Co., Ltd., Osaka, Japan), and the like.

In some embodiments, the monomer may be long-chain (meth)acrylic acid esters such as n-butyl(meth)acrylate, isobutyl(meth)acrylate, t-butyl(meth)acrylate, amyl(meth) acrylate, isoamyl(meth)acrylate, hexyl(meth)acrylate, heptyl(meth)acrylate, octyl(meth)acrylate, 2-ethylhexyl(meth) acrylate, nonyl(meth)acrylate, decyl(meth)acrylate, isodecyl (meth)acrylate, lauryl(meth)acrylate, tridecyl(meth) acrylate, hexadecyl(meth)acrylate, stearyl(meth)acrylate, isostearyl(meth)acrylate, cyclohexyl(meth)acrylate, isobonyl(meth)acrylate, and the like.

In some embodiments, the monomer may be acrylate compounds such as 1,1-bis(trifluoromethyl)-2,2,2-trifluoroethylacrylate, 2,2,3,3,4,4,4-heptafluorobutylacrylate, 2,2,3, 4,4,4-hexafluorobutylacrylate, nonafluoroisobutylacrylate, 2,2,3,3,4,4,5,5-octafluoropentylacrylate, 2,2,3,3,4,4,5,5,5-nonafluoropentylacrylate, 2,2,3,3,4,4,5,5,6,6-undecafluorohexylacrylate, 2,2,3,3,4,4,5,5,6,6,7,7,8,8,8-pentadecafluorooctylacrylate, 3,3,4,4,5,5,6,6,7,7,8,8,9,9,10,10,10-heptadecafluorodecylacrylate, 2,2,3,3,4,4,5,5,6,6,7,7,8,8,9, 9,10,10,10-nonadecafluorodecylacrylate, and the like, nonafluoro-t-butylmethacrylate, 2,2,3,3,4,4,4-heptafluorobutylmethacrylate, 2,2,3,3,4,4,5,5-octafluoropentylmethacrylate, 2,2,3,3,4,4,5,5,6,6,7,7-dodecafluoroheptylmethacrylate, heptadecafluorooctylmethacrylate, 2,2,3,3,4,4,5,5, 6,6,7,7,8,8,8-pentadecafluorooctylmethacrylate, 2,2,3,3,4,4, 5,5,6,6,7,7,8,8,9,9-hexadecafluorononylmethacrylate, and the like that have a fluoroalkyl group.

The monomers may be used singularly or in a combination of two or more. A mixing ratio of the acrylic acid and the monomer is not particularly limited.

The monomer may be at least one selected from acrylic acid, acrylonitrile, styrene, acrylic acid butyl, methoxytriethylene glycol methacrylate, and acrylamide, for ease of synthesis.

In some embodiments, the weight average molecular weight of the organic acid may be about 5,000 g/mol to about 1,000,000 g/mol, and specifically about 300,000 g/mol to about 800,000 g/mol. When the organic acid has a weight average molecular weight within the range, stable slurry may be prepared, battery characteristics are increased due to excellent adherence during being coated on an electrode, and curling of an electrode may be suppressed during drying after being coated to form an electrode well.

In some embodiments, the binder may include an organic acid and an organic base in a weight ratio of about 1:0.3 to about 1:1, and specifically about 1:0.3 to about 1:0.8. When the organic acid and the organic base are included in the weight ratio, cycle-life characteristics are more increased.

The binder may have a thermosetting temperature of less than or equal to about 200° C., specifically about 120° C. to about 200° C., and more specifically about 120° C. to about 180° C. When the binder has a thermosetting temperature within the range, a negative active material layer may be easily prepared.

In some embodiments, the mixing ratio of the negative active material and the binder is not particularly limited, and may be any applicable ratio to the negative active material layer of a rechargeable lithium battery.

An active mass density of the negative active material layer 32 is not particularly limited, and may be any applicable active mass density to a negative active material layer of a rechargeable lithium battery.

The negative electrode may be prepared according to the following method that includes dissolving the organic acid in water to obtain an acid solution; adding the organic base to the acid solution to obtain a binder solution; adding the negative active material to the binder solution to obtain a slurry; coating the slurry on a current collector to form a negative active material layer, and pressing the negative active material layer with a presser.

In some embodiments, the acid solution may have pH of about 2 to about 3, and a viscosity of about 4,000 cps to about 5,000 cps. When the acid solution has a pH and viscosity within the ranges, it may be easily substituted with the organic base, and thus excellent battery characteristics may be provided.

The binder solution may have a pH of about 6 to about 9, and specifically about 7 to about 8. The pH within the range of the binder solution closely reaches to neutral pH, which indicates that the organic acid may be nearly substituted with the organic base, and thus the organic base may be used in a maximum amount and battery characteristics such as cycle-life characteristics and initial efficiency and the like may be increased.

The positive electrode 20 includes a current collector 21 and a positive active material layer 22 formed on the current collector 21.

The current collector 21 may be any conductor, for example, aluminum, stainless steel, nickel-plated steel, and the like.

The positive active material layer 22 includes a positive active material, and additionally a conductive material and a binder.

The positive active material may include a lithium oxide-based solid solution but has no particular limit, as far as a material electrochemically intercalates or deintercalates lithium ions.

The lithium oxide-based solid solution may be specifically one of compounds represented by the following Chemical Formulae 1 to 3.

$$Li_aMn_xCo_yNi_zO_2 \quad \text{Chemical Formula 1}$$

In the above Chemical Formula 1, 1.150≤a≤1.430, 0.45≤x≤0.6, 0.10≤y≤0.15 and 0.20≤z≤0.28.

$$LiMn_xCo_yNi_zO_2 \quad \text{Chemical Formula 2}$$

In the above Chemical Formula 2, 0.3≤x≤0.85, 0.10≤y≤0.3 and 0.10≤z≤0.3.

$$LiMn_{1.5}Ni_{0.5}O_4 \quad \text{Chemical Formula 3}$$

The amount of the positive active material is not particularly limited.

In some embodiments, the conductive material may include, for example, carbon black such as ketjen black, acetylene black, and the like, natural graphite, artificial graphite, and the like but has no particular limit, as far as any material increases conductivity of a positive electrode.

In some embodiments, the amount of the conductive material is not particularly limited, and may be the same amount as used in a positive active material layer of a rechargeable lithium battery.

The binder may include, for example, polyvinylidene fluoride, an ethylene-propylene-diene terpolymer, a styrene-butadiene rubber, acrylonitrile-butadiene rubber, a fluoro rubber, polyvinyl acetate, polymethylmethacrylate, polyethylene, nitrocellulose, and the like, but has no particular limit as far as any material binds the positive active material and the conductive material on the current collector.

The amount of the binder is not particularly limited, but may be in an applicable amount to a positive active material layer of in a rechargeable lithium battery.

In some embodiments, the active mass density of the positive active material layer is not particularly limited, and may be any applicable active mass density to a positive active material layer of a rechargeable lithium battery.

The active mass density of the positive active material layer may be obtained by dividing the sheet density of the positive active material layer after the compression by the thickness of the positive active material layer after the compression.

The positive active material layer may be formed by, for example, dispersing the positive active material, the conductive material, and the binder in an organic solvent such as N-methyl-2-pyrrolidone and the like to form a slurry, and coating the slurry on the current collector followed by drying and compressing the same.

The coating method has no particular limit but may include a knife coating, a gravure coating, and the like.

The separator 40 is not particularly limited and may be any separator that is usable for a rechargeable lithium battery. Specifically, a porous film or a non-woven fabric having excellent high-rage discharge performance may be used singularly or as a mixture.

In some embodiments, the material of the separator may include a polyolefin-based resin such as polyethylene, polypropylene and the like; a polyester-based resin polyethylene terephthalate, polybutylene terephthalate, and the like; polyvinylidene fluoride, a vinylidene fluoride-hexafluoropropylene copolymer, a vinylidene fluoride-perfluorovinylether copolymer, a vinylidene fluoride-tetrafluoroethylene copolymer, a vinylidene fluoride-trifluoroethylene copolymer, a vinylidene fluoride-fluoroethylene copolymer, a vinylidene fluoride-hexafluoroacetone copolymer, a vinylidene fluoride-ethylene copolymer, a vinylidene fluoride-propylene copolymer, a vinylidene fluoride-trifluoropropylene copolymer, a vinylidene fluoride-tetrafluoroethylene-hexafluoropropylene copolymer, a vinylidene fluoride-ethylene-tetrafluoroethylene copolymer, and the like.

In some embodiments, the separator may be saturated with an electrolyte.

The electrolyte may not be particularly limited and may be anything usable for a rechargeable lithium battery.

Specifically, the electrolyte includes an electrolytic salt dissolved in a non-aqueous solvent.

In some embodiments, the non-aqueous solvent may becyclic carbonates such as propylene carbonate, ethylene carbonate, butylene carbonate, chloroethylene carbonate, vinylene carbonate, and the like; cyclic esters such as γ-butyrolactone, γ-valero lactone, and the like; linear carbonates such as dimethyl carbonate, diethyl carbonate, ethylmethyl carbonate, and the like; linear esters such as methyl formate, methyl acetate, methyl butyrate, and the like; tetrahydrofuran or a derivative thereof; ethers such as 1,3-dioxane, 1,4-dioxane, 1,2-dimethoxyethane, 1,4-dibutoxyethane, methyl diglyme, and the like; nitriles such as acetonitrile, benzonitrile and the like; dioxolane or a derivative thereof; ethylene sulfide, sulfolane, sultone or a derivative thereof, and the like. These may be used singularly or in a mixture of two or more.

In some embodiments, the electrolytic salt may be an inorganic ionic salt such as $LiClO_4$, $LiBF_4$, $LiAsF_6$, $LiPF_6$, LiSCN, LiBr, LiI, $Li_2SO_4$, $Li_2B_{10}C_{11}O$, $NaClO_4$, NaI, NaSCN, NaBr, $KClO_4$, KSCN, and the like; an organic ionic salt such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4Ni$, $(C_2H_5)_4N$-malate, $(C_2H_5)_4N$-benzoate, $(C_2H_5)_4N$-phthalate, lithium stearyl sulfonate, lithium octyl sulfonate, lithium dodecyl benzene sulfonate, and the like, and these ionic compounds may be used singularly or in a mixture of two or more.

The concentration of the electrolytic salt is not particularly limited but may be specifically about 0.1 mol/L to about 5.0 mol/L.

A rechargeable lithium battery may be manufactured as follows.

The separator is disposed between the positive electrode and the negative electrode to manufacture an electrode structure. Subsequently, the electrode structure is processed to have a desired shape, for example, a cylinder, a prism, a laminated type, a coin type, and the like and then, inserted into the container. Then, the above electrolyte is injected into the container, so that the pore of the separator 40a may be impregnated with the electrolyte.

Hereinafter, the embodiments are illustrated in more detail with reference to examples. These examples, however, should not in any sense be interpreted as limiting the scope of the present invention.

Furthermore, what is not described in this disclosure may be sufficiently understood by those who have knowledge in this field and will not be illustrated here.

Preparation of Organic Acid

Synthesis Example 1-1

Acrylic Acid/Acrylonitrile/Styrene (70/20/10) Copolymer 270 g of water was put in a 0.5 L four-necked flask having an agitator, a thermometer, a cooler, and a liquid-delivery pump. Subsequently, internal pressure of the flask was decreased down to 20 mmHg by using an aspirator, the internal pressure was increased up to a normal pressure by using nitrogen, and this process was three times repeated. Subsequently, the flask was internally maintained under a nitrogen atmosphere and heated in an oil bath at 60° C. while the water in the flask was agitated. Subsequently, an ammonium perlactate aqueous solution prepared by dissolving 0.12 g of ammonium perlactate in 5 g of water was added to the flask. After the ammonium perlactate aqueous solution was added into the flask, a mixture of 21.0 g of acrylic acid (made by Wako Junyaku Co., Japan), 6.0 g of acrylonitrile (made by Wako Junyaku Co.), and 3.0 g of styrene (made by Wako Junyaku Co., Japan) was added in a dropwise fashion from the delivery pump for 2 hours.

The aqueous solution in the flask was agitated for 4 hours and then heated to 80° C. Then, the aqueous solution was agitated for 2 hours. Accordingly, an acrylic acid/acrylonitrile/styrene copolymer (in a weight ratio of 70/20/10) was synthesized.

Synthesis Example 1-2

Acrylic acid/Butyl Acrylate/Styrene (70/20/10) Copolymer

An organic acid was prepared according to the same method as Synthesis Example 1-1 except that a mixture of 21.0 g of acrylic acid (made by Wako Junyaku Co.), 6.0 g of butyl acrylate (made by Wako Junyaku Co.), and 3.0 g of styrene (made by Wako Junyaku Co.) was used as monomers.

Synthesis Example 1-3

Acrylic Acid/Methoxytriethylene glycolmethacrylate/Styrene (70/20/10) Copolymer

An organic acid was prepared according to the same method as Synthesis Example 1-1 except that a mixture of 21.0 g of acrylic acid (made by Wako Junyaku Co.), 6.0 g of methoxytriethylene glycolmethacrylate (Sigma-Aldrich Co. Ltd.), and 3.0 g of styrene (made by Wako Junyaku Co., Japan) was used as a monomer.

Synthesis Example 1-4

Acrylic acid/Acrylamide/Styrene (70/20/10) Copolymer

An organic acid was prepared according to the same method as Synthesis Example 1-1 except that a mixture of 21.0 g of acrylic acid (made by Wako Junyaku Co.), 6.0 g of acrylamide (made by Wako Junyaku Co., Japan), and 3.0 g of styrene (made by Wako Junyaku Co.) was used as a monomer.

Evaluation 1

Non-Volatiles wt %, Acid Value, and Weight Average Molecular Weight of Organic Acid When the organic acids were prepared according to Synthesis Examples 1-1 to 1-4, the aqueous solution in the flask was cooled down to room temperature, about 1 ml of the aqueous solution was put on an aluminum pan and dried for 15 minutes on a hot plate which was heated up to 160° C. Subsequently, the weight of the aqueous solution was measured, and the weight of the residue, that is, the wt % of the non-volatiles, was calculated based on the measurement. The results are provided in the following Table 1. Herein, the wt % of the non-volatiles was calculated by dividing the weight of the residue by the weight of the aqueous solution.

In addition, about 0.5 ml of the aqueous solution was taken and put in a 100 ml beaker and then diluted with 45 ml of distilled water. Subsequently, the diluted aqueous solution was titrated by using a 0.05M potassium hydroxide ethanol solution, and the acid value of the organic acid was measured. The results are provided in the following Table 1.

In addition, size exclusion chromatography (SEC, calculated from polyethylene glycol) analysis was performed, and the weight average molecular weight of the organic acid was calculated based on the analysis result. The results were provided in the following Table 1.

TABLE 1

| | Polymer composition (weight ratio) | Non-volatiles (wt %) | Acid value (mgKOH/g) | Weight average molecular weight |
|---|---|---|---|---|
| Synthesis Example 1-1 | acrylic acid/acrylonitrile/styrene (70/20/10) | 9.98 | 542 | 520000 |
| Synthesis Example 1-2 | acrylic acid/butyl acrylate/styrene (70/20/10) | 9.96 | 543 | 460000 |
| Synthesis Example 1-3 | acrylic acid/methoxytriethylene glycol methacrylate/styrene (70/20/10) | 9.96 | 541 | 400000 |
| Synthesis Example 1-4 | acrylic acid/acrylamide/styrene (70/20/10) | 9.98 | 543 | 680000 |

Preparation of Binder

Synthesis Example 2-1

A water dispersion including 10 wt % of polyacrylic acid (acid solution, Sigma-Aldrich Co. Ltd., a weight average molecular weight of 450,000, viscosity of 4,000 cps) was weighed in a 200 ml plastic vessel capable of being closed and sealed. Herein, the water dispersion included the polyacrylic acid in an amount of 10 wt % based on the total weight of the dispersion. Subsequently, 1.90 g of paraphenylene diamine (Tokyo Kasei Inc., Tokyo, Japan) (0.38 parts by weight based on 1 part by weight of the polyacrylic acid) was added as an organic base to the water dispersion of polyacrylic acid, and the mixture was agitated for 5 minutes with an oil agitation defoaming device (Rotation: 800 rpm, Revolution: 2000 rpm, Thinky Co., Tokyo, Japan), to prepare a binder solution having a pH of 7 to 8.

Synthesis Examples 2-2 to 2-19

Each binder solution having a pH of 7 to 8 was prepared according to the same method as Synthesis Example 2-1 except for changing compositions of an organic acid and an organic base as provided in the following Table 2.

TABLE 2

| | Organic acid (weight average molecular weight) | Organic base | Organic acid:organic base (weight ratio) | Non-volatiles (wt %) |
|---|---|---|---|---|
| Synthesis Example 2-1 | polyacrylic acid (450000) | paraphenylene diamine | 1:0.38 | 13.3 |
| Synthesis Example 2-2 | polyacrylic acid (450000) | metaphenylene diamine | 1:0.38 | 13.3 |
| Synthesis Example 2-3 | polyacrylic acid (450000) | metaphenylene diamine | 1:0.50 | 14.3 |
| Synthesis Example 2-4 | polyacrylic acid (450000) | metaphenylene diamine | 1:0.80 | 16.7 |
| Synthesis Example 2-5 | polyacrylic acid (1250000) | metaphenylene diamine | 1:0.38 | 13.3 |
| Synthesis Example 2-6 | polyacrylic acid (450000) | aniline | 1:0.32 | 12.8 |
| Synthesis Example 2-7 | polyacrylic acid (450000) | cyclo-hexylamine | 1:0.34 | 13.0 |
| Synthesis Example 2-8 | polyacrylic acid (450000) | 3,5-diamino-benzoic acid | 1:0.53 | 14.5 |
| Synthesis Example 2-9 | polyacrylic acid (450000) | melamine | 1:0.43 | 13.7 |
| Synthesis Example 2-10 | Synthesis Example 1-1 (520000) | metaphenylene diamine | 1:0.38 | 13.3 |
| Synthesis Example 2-11 | Synthesis Example 1-2 (460000) | metaphenylene diamine | 1:0.38 | 13.3 |
| Synthesis Example 2-12 | Synthesis Example 1-3 (400000) | metaphenylene diamine | 1:0.38 | 13.3 |
| Synthesis Example 2-13 | Synthesis Example 1-4 (680000) | metaphenylene diamine | 1:0.38 | 13.3 |
| Synthesis Example 2-14 | polyacrylic acid (450000) | adamantane amine | 1:0.57 | 14.9 |
| Synthesis Example 2-15 | polyacrylic acid (450000) | pyridine | 1:0.38 | 13.3 |
| Synthesis Example 2-16 | polyacrylic acid (450000) | pyrrole | 1:0.37 | 13.2 |
| Synthesis Example 2-17 | alginic acid | metaphenylene diamine | 1:0.31 | 12.7 |
| Synthesis Example 2-18 | polyaspartic acid (5000-15000) | petaphenylene diamine | 1:0.47 | 14.0 |
| Synthesis Example 2-19 | polyacrylic acid (450000) | sodium hydroxide | 1:0.33 | 12.9 |

The alginic acid in Table 2 showed 1 weight/volume % and a viscosity ranging from 0.5 to 0.6 Pa·s.

Preparation of Negative Electrode for Rechargeable Lithium Battery Cell

Preparation Example 1

The mixture of 60 wt % of Si powder, 20 wt % of Ti powder, and 20 wt % of Ni powder were dissolved with high agitation under an argon atmosphere to prepare a molten solution. Subsequently, the molten solution was injected into a tundish and formed into a molten solution streamlet through a micropore on the bottom of the tundish. Subsequently, argon gas was sprayed into the molten solution streamlet to pulverize the molten solution to prepare a silicon-based alloy.

The cooling rate was in a range of 103° C./sec to 105° C./sec by measuring the distance between secondary arms of dendrite of an aluminum-copper alloy (containing 4 wt % of copper) coagulated under the same condition. In other words, the cooling rate was much faster than 100° C./sec. On the other hand, a heat treatment was not performed.

Subsequently, the mixture of 80 wt % of the silicon-based alloy, 10 wt % of artificial graphite, 2 wt % of ketjen black, and 8 wt % of the binder solution according to the Synthesis Example 2-1 was mixed, and water was added thereto to adjust the viscosity to prepare a negative active mass slurry. The negative active mass slurry included 40 wt % of non-volatiles. This measurement was the same as described above.

Subsequently, the negative active mass slurry was uniformly coated on a 10 μm-thick copper foil with a bar-coater by adjusting gap of the bar coater to obtain a loading amount (sheet density) of 4.5 mg/cm².

Subsequently, the negative active mass slurry was dried by a blowing drier set at 80° C. for 15 minutes. Subsequently, the negative active mass was pressed to provide an active mass density of 1.4 g/cc with a roll presser.

Subsequently, the negative active mass was vacuum-dried at 150° C. for 6 hours. In other words, the binder was thermally cured, manufacturing a sheet-type negative electrode including a current collector and a negative active material layer.

Preparation Examples 2 to 19

A negative electrode was manufactured according to the same method as Preparation Example 1 except for respectively using the binder solutions according to Synthesis Examples 2-2 to 2-19 instead of the binder according to Synthesis Example 2-1.

On the other hand, all the binders were thermally cured at 150° C. In other words, all the binders turned out to have a thermal curing temperature of less than or equal to 180° C.

Evaluation 2

Peeling Strength

The negative electrodes according to Preparation Examples 1 to 19 were cut into a 25 mm-wide and 100 mm-long rectangular shape and then, adhered to a glass plate faced with the active material side thereof by using a double-sided adhesive tape, preparing each sample for a peeling strength test.

The samples for a peeling strength test were mounted on a peeling tester (SHIMAZU EZ-S, Schimazu Scientific Instruments, Japan) and their peeling strength at 180° was measured. The results are provided in the following Table 3.

TABLE 3

| | Binder Solution | Peeling strength (mN/mm) |
|---|---|---|
| Preparation Example 1 | Synthesis Example 2-1 | 68 |
| Preparation Example 2 | Synthesis Example 2-2 | 70 |
| Preparation Example 3 | Synthesis Example 2-3 | 75 |
| Preparation Example 4 | Synthesis Example 2-4 | 78 |
| Preparation Example 5 | Synthesis Example 2-5 | 80 |
| Preparation Example 6 | Synthesis Example 2-6 | 79 |
| Preparation Example 7 | Synthesis Example 2-7 | 68 |
| Preparation Example 8 | Synthesis Example 2-8 | 65 |
| Preparation Example 9 | Synthesis Example 2-9 | 90 |
| Preparation Example 10 | Synthesis Example 2-10 | 70 |
| Preparation Example 11 | Synthesis Example 2-11 | 74 |
| Preparation Example 12 | Synthesis Example 2-12 | 72 |
| Preparation Example 13 | Synthesis Example 2-13 | 69 |
| Preparation Example 14 | Synthesis Example 2-14 | 80 |
| Preparation Example 15 | Synthesis Example 2-15 | 78 |
| Preparation Example 16 | Synthesis Example 2-16 | 75 |
| Preparation Example 17 | Synthesis Example 2-17 | 85 |
| Preparation Example 18 | Synthesis Example 2-18 | 90 |
| Preparation Example 19 | Synthesis Example 2-19 | 60 |

From Table 3, the negative electrodes according to Preparation Example 1 to 18 showed high peeling strength relative to the negative electrode according to the Preparation Example 19. Accordingly, the binder according may provide a negative electrode having excellent close contacting properties.

Manufacture of Rechargeable Lithium Battery Cell

Example 1

The negative electrode of Preparation Example 1 was cut into a disk having a diameter of 1.3 cm, and then a metal lithium disk having a diameter of 1.5 cm, a polyethylene porous separator having a thickness of 25 μm and a diameter of 1.3 cm, the negative electrode disk having a diameter of 1.3 cm, and a copper film having a thickness of 200 μm and a diameter of 1.5 cm as a spacer were sequentially stacked in a stainless steel coin container having a diameter of 2.0 cm. Subsequently, an electrolyte, that is, an electrolyte including 1.4M $LiPF_6$ dissolved in a mixed solvent of ethylene carbonate/diethylcarbonate/fluoroethylenecarbonate (10/70/20 of a volume ratio) was dropped in the container not until it overflown. Subsequently, the container was wrapped with a polypropylene packing material, covered with a stainless steel cap, and sealed with a sealer for a coin cell to manufacture a rechargeable lithium battery cell.

Examples 2 to 18 and Comparative Example 1

A rechargeable lithium battery cell was manufactured according to the same method as Example 1 except for respectively using the negative electrodes according to Preparation Examples 2 to 19 instead of the negative electrode according to Preparation Example 1.

Evaluation 3

Expansion Ratio of Negative Electrode

The rechargeable lithium battery cells according to Examples 1 to 18 and Comparative Example 1 were charged at 0.1 C under a constant current-constant voltage at 25° C. and disassembled in a glove box. Each negative electrode in a charge state was taken out the rechargeable lithium battery cells, washed with diethylcarbonate, and dried. After drying, the thickness of the negative electrodes was measured with a micro gauge.

Each expansion ratio of the negative electrodes during the charge was calculated by dividing the thickness of the negative active material layer without the thickness of a current collector by the thickness of the negative active material layer before the charge. The results are provided in the following Table 4.

Evaluation 4

Cycle-Life Characteristics

The rechargeable lithium battery cells according to Examples 1 to 18 and Comparative Example 1 were charged at 0.2 C under a constant current-constant voltage at 25° C. and discharged from 0.7 C to 0.01 C under a constant current, and the charge and discharge cycle was repeated for 50 times.

Discharge capacities of the rechargeable lithium battery cells after 1 cycle and 50 cycles were measured. Subsequently, the capacity retention (%) of the rechargeable lithium battery cells was calculated by dividing the discharge capacity after 50 cycles by the discharge capacity after 1 cycle. The higher the capacity retention was, the more excellent cycle-life characteristics the rechargeable lithium battery cells showed. The results are provided in the following Table 4.

TABLE 4

| | Expansion ratio of negative electrode (%) | Capacity retention (%) |
|---|---|---|
| Example 1 | 49 | 92 |
| Example 2 | 43 | 96 |
| Example 3 | 43 | 97 |
| Example 4 | 45 | 96 |
| Example 5 | 44 | 96 |
| Example 6 | 47 | 80 |
| Example 7 | 48 | 80 |
| Example 8 | 44 | 93 |
| Example 9 | 40 | 96 |
| Example 10 | 42 | 94 |
| Example 11 | 46 | 95 |
| Example 12 | 43 | 72 |
| Example 13 | 45 | 91 |
| Example 14 | 42 | 96 |
| Example 15 | 45 | 95 |
| Example 16 | 46 | 95 |
| Example 17 | 41 | 97 |
| Example 18 | 43 | 96 |
| Comparative Example 1 | 59 | 55 |

Referring to Table 4, the rechargeable lithium battery cells including the binders according to Examples 1 to 18 showed a smaller expansion ratio of a negative electrode and a high capacity retention compared with the rechargeable lithium battery cell according to Comparative Example 1. The reason is that the binder had high peeling strength and thus suppressed shrinkage and expansion of the negative active material.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A negative electrode for a rechargeable lithium battery, comprising
a current collector; and
a negative active material layer positioned on the current collector and including a negative active material and a binder,
wherein the negative active material comprises a silicon-based material, a tin-based material, or a combination thereof,
the binder comprises an organic acid comprising a carboxyl group-containing polymer and an organic base having a cyclic structure, and
wherein the organic base is selected from aromatic amine, alicyclic amine, and combination thereof.

2. The negative electrode for a rechargeable lithium battery of claim 1, wherein the organic acid comprises at least one selected from polyasparaginic acid, polyaspartic acid, alginic acid of a natural polymer, a homopolymer of acrylic acid, a copolymer of acrylic acid and another monomer, and any combinations thereof.

3. The negative electrode for a rechargeable lithium battery of claim 1, wherein the weight average molecular weight of the organic acid is in the range of about 5,000 g/mol to about 1,000,000 g/mol.

4. The negative electrode for a rechargeable lithium battery of claim 1, wherein the aromatic amine comprises at least one selected from paraphenylene diamine, metaphenylene diamine, aniline, 3,5-diaminobenzoic acid, melamine, and a derivative thereof.

5. The negative electrode for a rechargeable lithium battery of claim 1, wherein the alicyclic amine comprises at least one selected from cyclohexyl amine, cyclopentyl amine, norbornene amine, adamantane amine, and a derivative thereof.

6. The negative electrode for a rechargeable lithium battery of claim 1, wherein the cyclic amine comprises at least one selected from a pyridine, piperidine, azole-based compound, and a derivative thereof.

7. The negative electrode for a rechargeable lithium battery of claim 6, wherein the azole-based compound comprises at least one selected from pyrrole, imidazole, pyrazole, and a triazole.

8. The negative electrode for a rechargeable lithium battery of claim 1, wherein the binder comprises the organic acid and the organic base in a weight ratio of about 1:0.3 to about 1:1.

9. The negative electrode for a rechargeable lithium battery of claim 1, wherein the binder has a thermosetting temperature of less than or equal to about 200° C.

10. The negative electrode for a rechargeable lithium battery of claim 1, wherein the silicon-based material comprises a silicon-containing alloy.

11. A method of preparing a negative electrode for a rechargeable lithium battery, comprising
dissolving a carboxyl group-containing organic acid in water to obtain an acid solution;
adding an organic base having a cyclic structure to the acid solution to obtain a binder solution;
adding a negative active material including a silicon-based material, a tin-based material, or a combination thereof to the binder solution to provide a slurry; and
coating the slurry on a current collector to form a negative active material layer.

12. The method of claim 11, wherein the viscosity of the acid solution is about 4,000 cps to about 5,000 cps.

13. The method of claim 11, wherein the binder solution has pH of about 6 to about 9.

14. A rechargeable lithium battery, comprising
a positive electrode;
the negative electrode according to claim 1; and
an electrolyte.

15. The method of claim 11, wherein the organic acid comprises at least one selected from polyasparaginic acid, polyaspartic acid, alginic acid of a natural polymer, a homopolymer of acrylic acid, a copolymer of acrylic acid and another monomer, and any combinations thereof.

16. The method of claim 11, wherein the organic base is an amine-based compound having a cyclic structure.

17. The method of claim 11, wherein the binder comprises the organic acid and the organic base in a weight ratio of about 1:0.3 to about 1:1.

18. The method of claim 11, wherein the silicon-based material comprises a silicon-containing alloy.

* * * * *